Nov. 19, 1935.  F. K. FILDES  2,021,503
CONTAINER CARRYING VEHICLE
Filed March 15, 1933  4 Sheets-Sheet 1
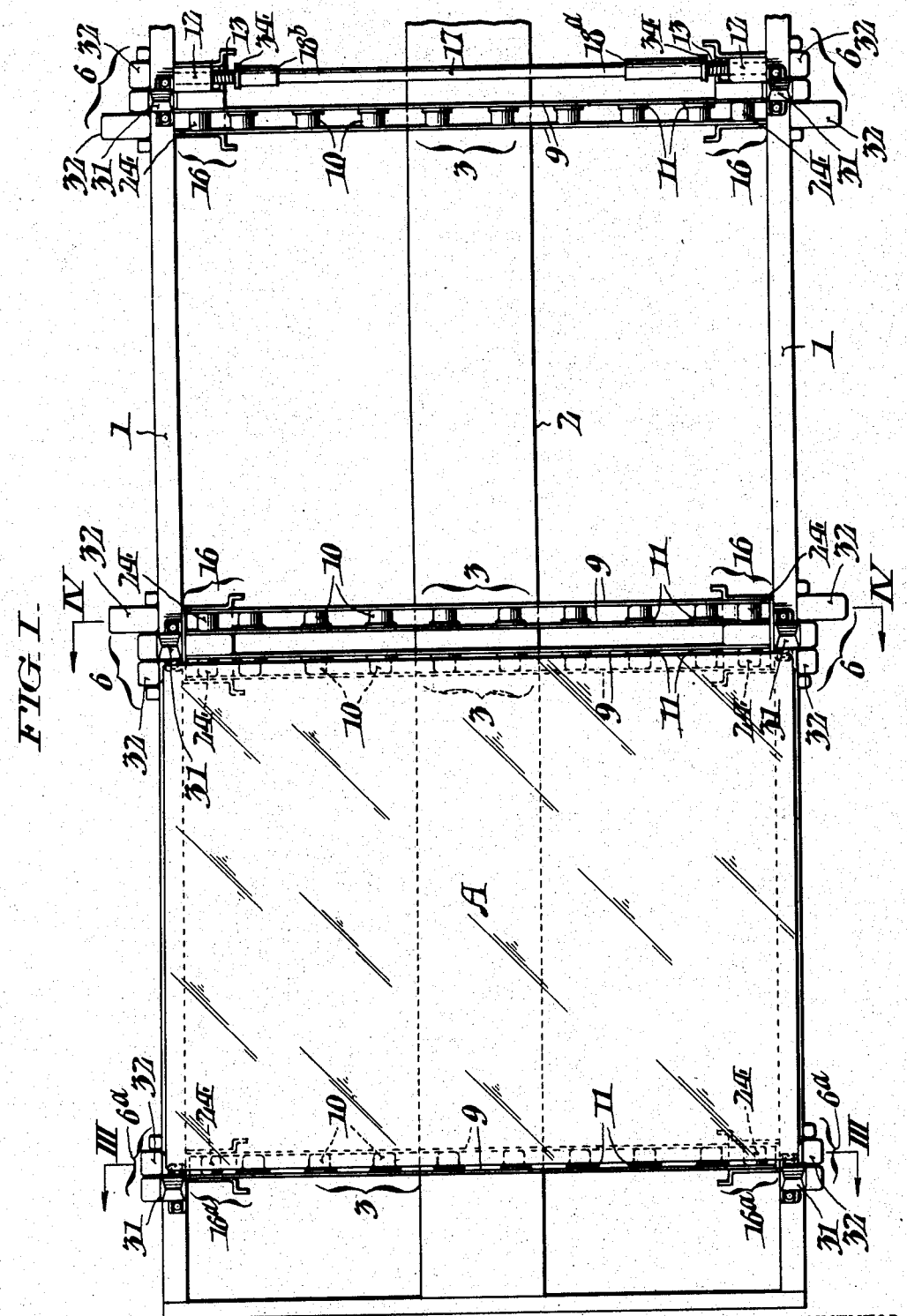

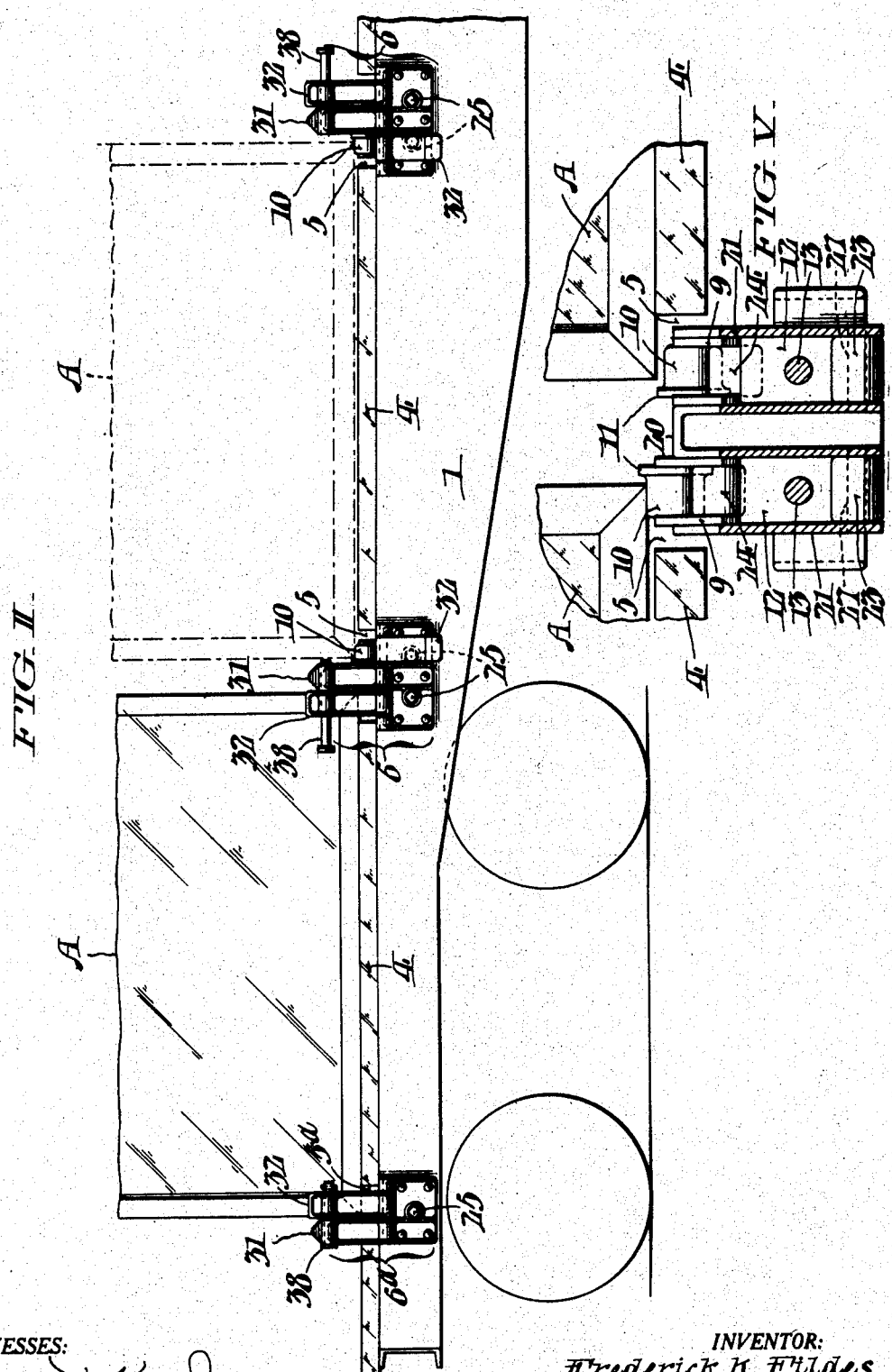

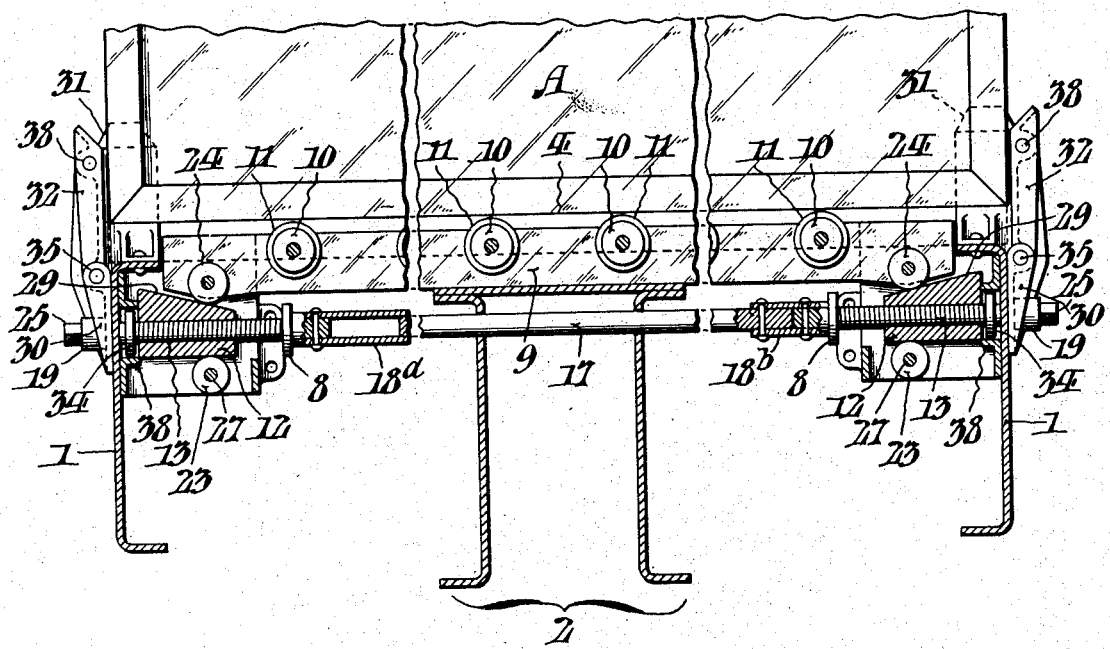
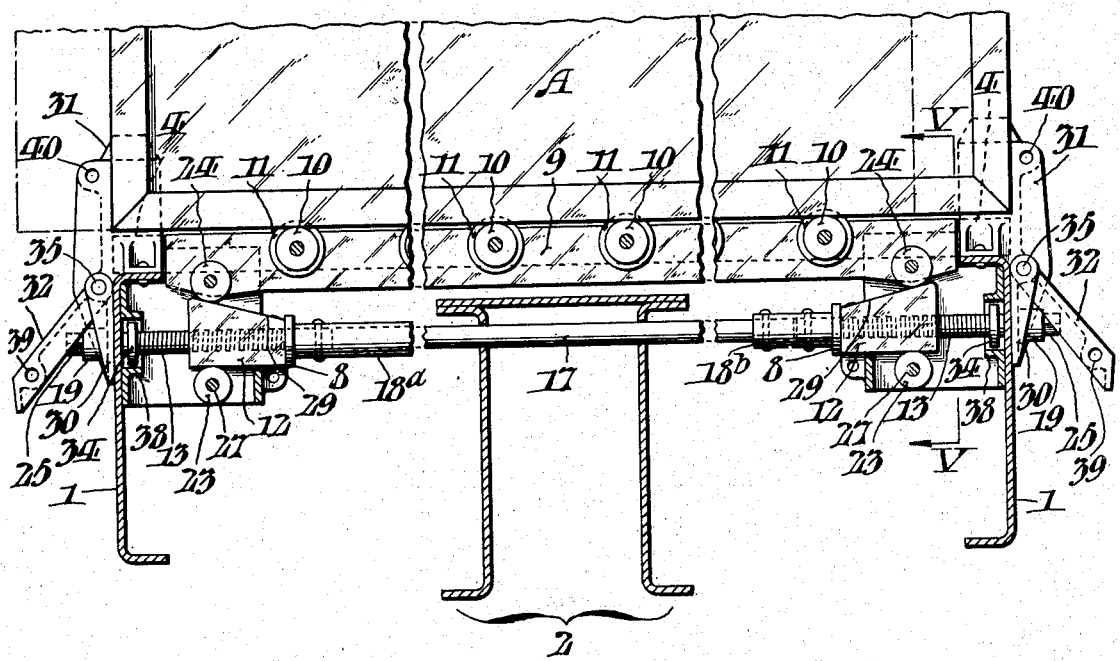

Nov. 19, 1935.  F. K. FILDES  2,021,503
CONTAINER CARRYING VEHICLE
Filed March 15, 1933  4 Sheets-Sheet 4
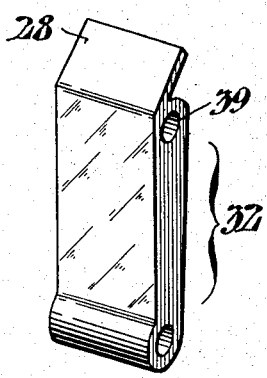
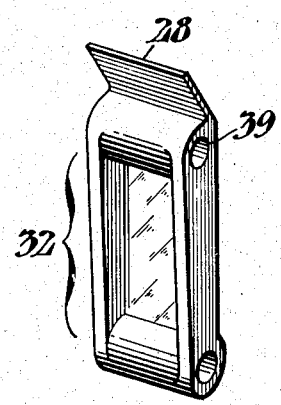
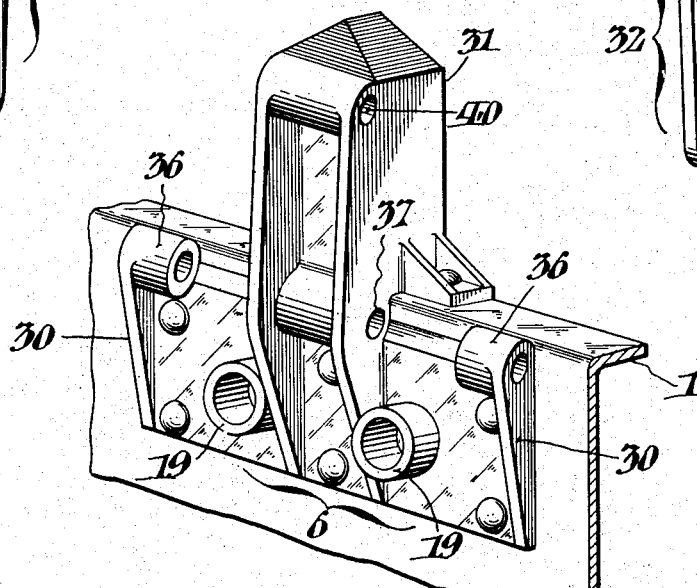
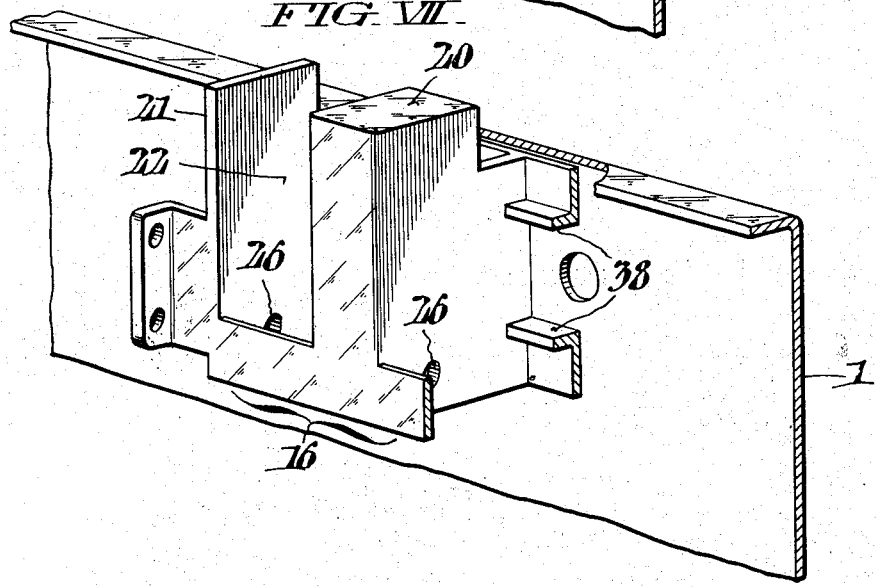

Patented Nov. 19, 1935

2,021,503

UNITED STATES PATENT OFFICE 2,021,503

CONTAINER CARRYING VEHICLE

Frederick K. Fildes, Altoona, Pa.

Application March 15, 1933, Serial No. 660,821

7 Claims. (Cl. 105—366)

This invention relates generally to container carrying vehicles, and more particularly to apparatus for loading and unloading containers from such vehicles.

In the development of the railroad shipping container art, much attention has been directed to means for loading and unloading containers without the use of cranes or other cumbersome apparatus not likely to be available at wayside stations. There have been various suggestions in the art of ways of overcoming the difficulties involved, but, so far as I am aware, the need for a simple and practical apparatus of this nature has not found fulfillment.

Consequently one object of my invention is to provide a means, simple in nature and construction, which will facilitate the loading and unloading of containers from container carrying vehicles.

A further object of my invention is the provision of such means with the added functional characteristic of guiding the containers properly to predetermined seats on the platform of the container carrying vehicle, and of guiding the containers from those seats in unloading from the vehicle platform, without jamming against adjacent containers.

A further object of my invention is the provision of such means incorporated in a practical manner into the vehicle structure, so that it is always available for use and yet normally out of engagement with the containers to allow the platform to support the containers directly and thus to offer resistance to accidental dislodgment or shifting of the containers on the vehicle.

Other objects and advantages of the invention will be apparent from the detailed description of a preferred embodiment thereof as hereinafter described having reference to the accompanying drawings of which:

Fig. I represents a plan view of one end of a railway container carrying vehicle of my invention with the floor removed to show the car frame and with one container seated thereon.

Fig. II represents a side elevation of the same, showing in addition a container in dotted lines in raised position on supporting guides preparatory to its being moved onto or off its seat on the platform.

Fig. III represents a sectional view, taken as indicated by the lines III—III of Fig. I, showing the roller guides housed beneath the platform and container supported on said platform.

Fig. IV represents a sectional view, taken as indicated by the lines IV—IV of Fig. I, showing the roller guides in a raised position with a container supported thereon.

Fig. V represents a cross-section, taken as indicated by the lines V—V of Fig. IV, showing one roller guide raised and supporting a container and another roller guide housed clear of the container resting on the platform.

Fig. VI represents a perspective view of a combination container seating abutment with its side elements removed.

Fig. VII represents a perspective view of a double wedge housing with one side broken away to show a guideway within the housing.

Fig. VIII represents a perspective view of a side element of the combination abutment of Fig. VI; and, Fig. IX represents another perspective view of the same, showing the reverse side.

With reference to the particular example of my invention shown in the drawings, Fig. I shows a plan view of a portion of a railway container carrying vehicle with the platform removed to show parts of the frame. The side sills of the car are designated at 1, and the center sill at 2. Spaced longitudinally of the car and extending transversely from side to side, are vertically movable roller guides 3 which serve as means for facilitating the loading and unloading of the containers, there being a pair of roller guides for each container seating space of the car. Normally the roller guides 3 are housed beneath the top surface of the car platform in which positions they rest upon the center sill 2 as clearly shown in Fig. III.

The car platform is designated at 4 and is most clearly illustrated in Figs. II and V. While the car platform may take a number of different forms, I preferably employ a construction which affords a continuous floor except for transversely extending openings 5, 5a at the regions between the container seating spaces. Thus when the containers represented at A are seated on the car, the platform 4 presents relatively large floor surfaces to the bottoms of the containers, and the frictional resistance to shifting of the containers is correspondingly large, relieving the container seating abutments of undue stress. Combination end and side abutments 6 for the containers, shown in detail in Figs. VI, VIII and IX, define the corners of rectangular seats which determine the positions occupied by the containers mounted between the ends of the car. Additional combination side and end abutments 6a define corners for the container seats at the end of the car.

The roller guides 3 are made up of metal roller frames 9, two to each roller guide, and rollers 10 mounted between the members of a pair. The rollers 10 have flanges 11 for guiding the bottom edges of containers in a manner similar to the interaction of a flanged wheel of a railway car on a rail. At each end of the car there is a single roller guide 3 movable vertically in the platform opening 5a, whereas in each opening 5, at the intermediate regions of the car, there are two adjacent roller guides 3 spaced from each other in parallel relation.

The roller guides 3 are supported by elevating means which exhibit a simplicity of structure as one of their most valuable characteristics. The particular elevating means shown comprise two elevating wedges 12, one to support each end of a roller guide 3; a screw-threaded actuating shaft 13 for each pair of elevating wedges 12, and wedge housings 16, 16a which prevent the wedges from rotating. Each wedge 12 is mounted on an actuating shaft 13 and guided in such manner that rotary movement of the shaft imparts movement to the wedge in a direction transverse to the long axis of the car. The actuating shafts 13, which may obviously be made in a single piece, are in the illustrated example made up of several sections including a solid bar 17 and sleeves 18a, 18b riveted thereto. Each of the sleeves 18a, 18b includes a collar 8 which serves as a stop limiting the inward movement of the wedge at that end of the shaft 13. The outer ends of the actuating shafts 13 are supported by bearings 19 at the side of the frame 1 in the combination side and end abutments 6, 6a and in the walls of the wedge housings 16 (best shown in Figs. VI and VII) and 16a. As the adjacent roller guides 3 of adjacent pairs come very close together, the wedge housings 16 at regions of the car intermediate the ends are constructed with a relatively thick wall 20 in the center and relatively thin walls 21 at each side thereof, the walls defining individual guideways 22 for the wedges. In Fig. VII one of these double wedge housings 16 is shown with one of the thin walls 21 cut away to show the interior of a guideway 22. In each guideway 22 there is mounted a roller 23 with which the lower flat surface of an elevating wedge 12 contacts. The guideways 22 in an obvious manner prevent the elevating wedges 12 from turning with their actuating shafts 13. The upper inclined surfaces 29 of the elevating wedges 12 support the ends of the roller guides 3 with substantionally frictionless contact through additional rollers 24 mounted on the roller guides 3 at each end, one on each side. The actuating shafts 13 are revolved by means of a removable handle, not shown in the drawings, which is adapted to be applied to the nut end 25 of any selected actuating shaft 13, the handle having a socket of corresponding shape. The holes 26 in the wedge housings 16, clearly shown in Fig. VII, afford bearings for the axles 27 of the rollers 23. At the ends of the vehicle the wedge housings 16a are of a construction similar to the intermediate housings 16 except that they are designed to accommodate a single wedge 12.

To maintain the containers in their respective seating positions, the combination end and side abutments 6, 6a are riveted to the frame at the sides of the vehicle. Two such abutments 6a are disposed near the ends of the vehicle and serve to define end corners for the two end containers. The intermediate abutments 6, as shown in detail in Figs. VI, VIII and IX, comprise in each instance a base portion 30 adapted for attachment to the side sills 1, an upstanding rigid element 31 for engagement with the end walls of adjacent containers, and hinged elements 32 having inclined guiding surfaces 28 for engagement with the side walls of adjacent containers. The bearings 19 which accommodate the outer ends of the actuating shafts 13 are preferably formed integrally with the base portions 30 of the abutments 6; and at the inside of the side sills, as shown in Fig. VII, spaced brackets 38 in the form of angles are preferably provided to house the thrust collars 34 near the ends of the actuating shafts.

The hinged elements 32 of the combination abutments 6 are disposed opposite the ends of the roller guides 3 and have capacity to swing outwardly and downwardly to afford an unobstructed path for containers being unloaded from or loaded onto the vehicle. The pintles 35 of the hinged elements 32 are supported within bearings 36 at their outer ends and within holes 37 in the rigid element 31 at their inner ends. Locking pins 38 serve to maintain the hinged elements 32 in upright position, the pins 38 passing through cylindrical openings 39 in the hinged elements into holes 40 in the rigid elements. The end abutments 6a are substantially similar to the intermediate abutments 6 except that only one hinged element 32 is required.

The operation of the illustrated embodiment of my invention will be explained by describing the unloading of a container assumed to be seated on the carrying vehicle at the end of its journey, the vehicle being drawn alongside a station platform. Of course, a truck designed to receive the container could take the place of the usual station platform. To unload the container the two roller guides 3 underneath the container are raised from housed positions beneath the platform 4 by turning the actuating shafts 13, causing the elevating wedges 12 to move inwardly until the container is lifted clear of its seat on the platform 4. When the container has been thus raised, the two hinged abutment elements 32 restraining the container on the side of the vehicle platform 4 adjacent to the station platform are unlocked and swung down. The container may then be shoved along its roller guides onto the adjacent platform. To load a container onto the carrying vehicle from a station platform, or from a truck, the reverse operation is carried out.

From the above description it will be apparent that the apparatus of this invention lends itself to simple and rugged construction and can be manipulated handily by a single person. It is easily incorporated into an ordinary flat car and fulfills the need of an unloading apparatus which goes with the car, thereby avoiding dependence on cranes, lift trucks or other like apparatus at the loading and unloading stations. While the car is transporting containers, the roller guides are completely relieved of the load, and the containers are seated in the usual fashion resting on the vehicle platform. Moreover, the car may obviously be used for many other purposes than for the transportation of containers.

While my invention has been described in some detail with reference to a preferred embodiment thereof, various changes in the form of the apparatus are within the contemplation of the invention, and such changes should not be deemed to constitute a departure from the spirit of the invention as hereinafter claimed.

Having thus described my invention, I claim:

1. In combination with a container carrying vehicle having a frame and a platform thereon, said platform having transversely extending openings spaced longitudinally to coincide with the edges of containers arranged on said platform according to a predetermined seating plan, a plurality of paired transversely extending roller guides supported by said frame and having capacity for vertical movement from completely housed positions in said openings in said platform, each said roller guide having flanges to positively engage the bottom edge of a container, and abutments rigidly mounted between adjacent guides of adjacent pairs on each side of said vehicle, side abutments for each container on both sides of said platform, said side abutments having capacity for swinging clear of the top level of said platform, said end and side abutments defining container seats, and means for raising each said roller guide above the level of the top surface of said platform for loading and unloading containers.

2. In combination with a container carrying vehicle having a frame and a platform thereon, said platform having transversely extending openings spaced longitudinally to coincide with the edges of containers arranged on said platform according to a predetermined seating plan, a plurality of paired transversely extending roller guides supported by said frame, each said roller guide having flanges to positively engage the bottom edge of a container, and having capacity for vertical movement from completely housed positions in said openings in said platform, combination end and side abutments fastened to said frame at the edges of said platform opposite the ends of adjacent guides of adjacent pairs and defining container seats, the side abutment elements of said combination abutments having capacity for swinging clear of said platform, and means for locking said side abutment element in an upright position.

3. In combination with a container carrying vehicle having a frame and a platform thereon, said platform having transversely extending openings spaced longitudinally of said platform to coincide with the edges of containers arranged on said platform according to a predetermined seating plan, transversely extending roller guides movably mounted on said frame and having capacity for vertical movement from completely housed positions in said openings, each said roller guide comprising a rigid frame with flanged rollers mounted thereon to positively engage the bottom edge of a container, pairs of elevating wedges supported by said frame under said guides, a pair to each guide, and means for simultaneously moving the wedges of each pair to raise said roller guides above the top level of said platform for unloading and loading containers.

4. In combination with a container carrying vehicle having a frame and a platform thereon, said platform having transversely extending openings spaced longitudinally thereof to coincide with the edges of containers arranged on said platform according to a predetermined seating plan, transversely extending roller guides supported by said frame and having capacity for vertical movement from completely housed positions in said openings, each said roller guide being flanged to positively engage the bottom edge of a container, actuating shafts mounted in said frame underneath and in parallel relation with said roller guides, pairs of elevating wedges disposed with their upper inclined surfaces in contact with said guides, said wedges being engaged by said actuating shafts and the wedges of a pair being adapted to move in opposite directions on rotation of said shafts incident to raising said roller guides above the top level of said platform for loading and unloading containers.

5. In combination with a container carrying vehicle having a frame and platform, transversely extending roller guides supported by said frame and having capacity for vertical movement to positions above and below the platform, each said roller guide being flanged to positively engage the bottom edge of a container, combination end and side abutments fastened to said frame at the edges of said platform opposite the ends of adjacent guides of adjacent pairs and defining container seats, the side abutment elements of said combination abutments having capacity for swinging clear of said platform, and the end abutment elements being rigid, actuating shafts mounted in said frame underneath and in parallel relation with said roller guides, pairs of elevating wedges disposed with their upper inclined surfaces in contact with said guides, said wedges being engaged by said actuating shafts, and guideways for said wedges disposed at the inside of said side abutment elements.

6. In combination with a container carrying vehicle having a frame and platform, said platform having transversely extending openings spaced longitudinally of said platform to coincide with the edge of containers arranged on said platform according to a predetermined seating plan, transversely extending roller guides supported by said frame, each said roller guide being flanged to positively engage the bottom edge of a container, and having capacity for vertical movement from completely housed positions in said openings, combination end and side abutments fastened to said frame at the edges of said platform opposite the ends of adjacent guides of adjacent pairs, the side abutment element of said combination abutments having capacity for swinging clear of said platform, actuating shafts mounted in said frame underneath and in parallel relation with said roller guides, pairs of elevating wedges engaged by said actuating shafts and adapted to move in opposite directions on rotation of said shafts incident to raising said roller guides above the top level of said platform for loading and unloading containers, and rollers mounted on said roller guides at each end and in contact with the inclined top surfaces of said elevating wedges.

7. In combination with a container carrying vehicle having a frame and a platform thereon, end and side seating abutments disposed on said platform to provide seats for containers according to a predetermined seating plan, said side abutments having capacity for swinging down below the level of said platform to allow unobstructed loading and unloading of containers, said platform having transversely extending openings spaced longitudinally to coincide with the edges of said seats, a plurality of paired transversely extending roller guide bars supported by said frame and having capacity for vertical movement from completely housed positions in said openings in said platform, the rollers of each guide bar being flanged on the outside to positively engage the bottom edges of a container, and means for raising each said roller guide bars above the level of the top surface of said platform for loading and unloading containers.

FREDERICK K. FILDES.